Aug. 30, 1932.  W. S. JACKSON  1,875,298
ELECTRIC INDUCTION FURNACE
Filed Oct. 24, 1930
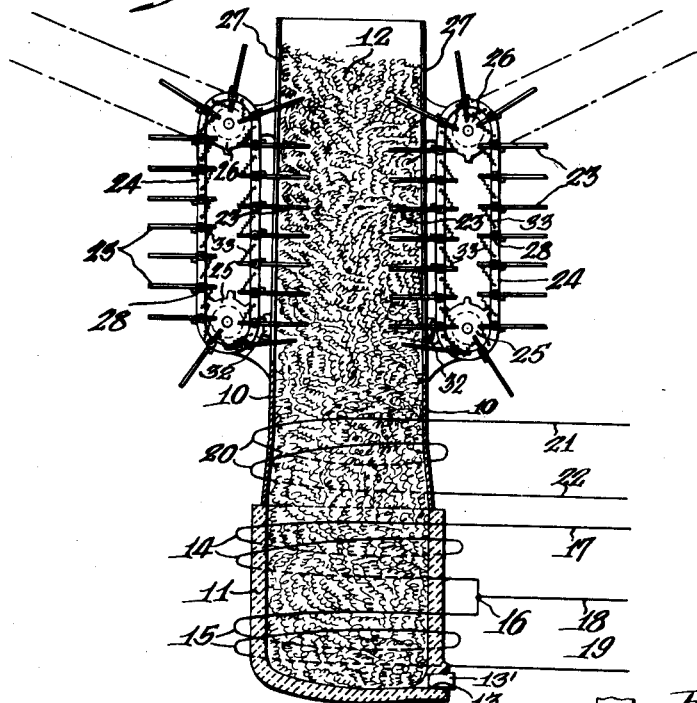
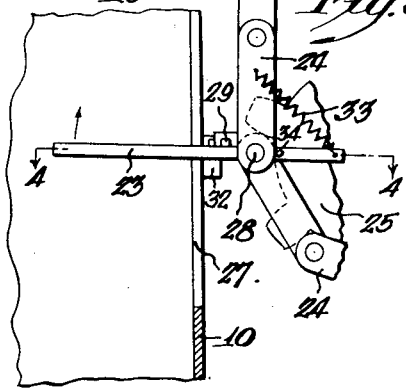
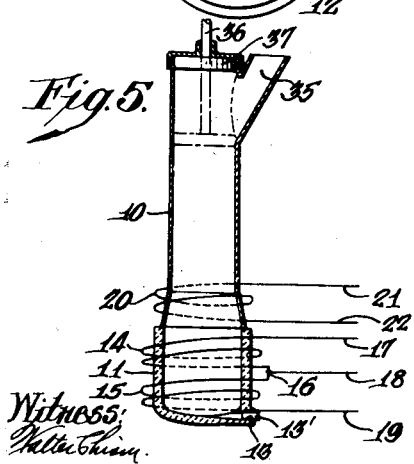
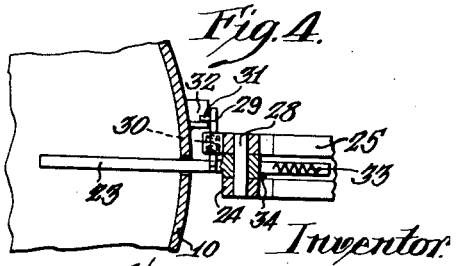
Inventor
Wm Steel Jackson
Witness:
Walter Chinn Patented Aug. 30, 1932

1,875,298

UNITED STATES PATENT OFFICE

WILLIAM STEELL JACKSON, OF BALA-CYNWYD, PENNSYLVANIA, ASSIGNOR TO AJAX ELECTROTHERMIC CORPORATION, OF TRENTON, NEW JERSEY, A CORPORATION OF NEW JERSEY

ELECTRIC INDUCTION FURNACE

Application filed October 24, 1930. Serial No. 490,961.

My invention relates to furnaces intended for melting scrap metal and applies particularly to the shaft type of such furnaces invented by Edwin F. Northrup, whose application for patent, Serial No. 378,834, for induction electric furnace, filed July 17, 1929, is copending herewith.

The main purpose of my invention is to assist in feeding scrap to an induction electric furnace so as not only to feed the scrap consistently to take the place of scrap which is melted but also to provide pressure upon the scrap to improve the contacts of the individual pieces of scrap.

A further purpose is to compress scrap during preheating, using positive pressure applied in the furnace itself.

A further purpose is to provide a feed conveyor moving longitudinally of a furnace shaft and by which the scrap is engaged and fed.

Further purposes will appear in the specification and in the claims.

I prefer to illustrate my invention by one main form and a modification, selecting the form and modification primarily with a view to illustrating the principles of the invention.

Figure 1 is a diagrammatic central vertical section of one form of my invention.

Figure 2 is a top plan view of the structure seen in Figure 1.

Figure 3 is an enlarged fragmentary section corresponding to part of Figure 1.

Figure 4 is a fragmentary section of Figure 3 taken upon the line 4—4.

Figure 5 is a diagrammatic view of a modification.

The handling of large quantities of scrap in preparation for remelting is a problem of considerable difficulty owing to the bulk of the scrap, whose uncabbaged volume may easily represent twenty times the volume of the metal when melted.

In the present practice the scrap is ordinarily cabbaged and then transferred from the place of cabbaging to some other plant for remelting. The cabbaging equipment is quite expensive and the cost of handling to supply the scrap to the cabbaging plants is quite as expensive as the cost of handling the scrap to load it into a furnace for actual remelting.

Dr. Northrup discovered that, by feeding the scrap through a shaft to afford reasonable continuity of supply and weight for pressure feeding and by the use of high frequency current in induction furnaces of relatively large content, the scrap could be melted without cabbaging and without the necessity for holding any considerable pool of molten metal for immersion of the scrap.

My invention is intended to cooperate with a shaft construction of the character invented by Dr. Northrup, and to provide additional feeding facilities.

Large furnace cross section is needed with scrap because the effective diameter of the equivalent solid metal is very much smaller than that of the scrap and the depth of penetration of the induced current within the scrap will be correspondingly great for any given frequency.

The induction of current within the scrap mass is reduced by the comparatively poor contact between adjoining individual pieces of scrap such as turnings.

My invention is directed primarily to the improvement of the conditions for induction by securing a much greater concentration of metal within the furnace and also coincidently by obtaining better contact between the pieces of scrap.

I do not rely upon the weight of the head of scrap above the pool to compress the scrap within the zones of inductive heating, but I feed the scrap positively toward the melting zone, and concurrently compress it to increase the density of scrap in the preheating and melting zones and to improve the electrical contact from one part of the scrap to another.

The details of construction of the furnace used will permit of considerable variation and are described primarily in order to show the setting in which the invention will be applied.

The furnace of my preferred form (Figures 1 to 4) consists of a shaft 10 having a crucible 11 and containing scrap 12 charged at the top. The furnace is tapped through an opening 13 closed by a plug 13'.

Inductor coil sections 14 and 15, connected at 16 and supplied with alternating current through leads 17, 18 and 19, surround the crucible 11. The electrical connections illustrated are especially suited to two-phase alternating current, but obviously single-phase or current having more than two phases could be used to supply the coils, and the number of coil sections would be varied accordingly.

In addition to the inductor coil sections 14 and 15, through which pass current primarily intended to melt the scrap, an inductor coil section 20 surrounds the lower part of the shaft to preheat the scrap. This coil is desirably supplied with alternating current from the same or a separate source through leads 21 and 22.

The use of the preheating inductor coil, while advantageous, may be regarded as optional in one aspect of my invention. In another aspect the preheating inductor is essential, but could be used with some other means of melting, as for example arc melting.

Above the preheating inductor coil and below the top of the stack are located suitable means to progress the scrap toward the melting zone and to compress the scrap prior to inductive preheating or melting.

The feeding means of Figure 1 consists of feeder blades 23 moving on a chain 24 about sprockets 25 and 26 through slots 27 in the wall of the shaft. Two conveyors are shown at circumferentially spaced intervals around the shaft in order to avoid inequality in pressures at opposite sides of the shaft and uneven feeding.

The feeder blades 23 travel through the slots 27 from the top to the bottom of the slots. Driving means are connected intermittently or continuously to the sprockets or to their shafts.

For withdrawal of the feeder blades from the slots 27, the blades are pivotally mounted at 28 to the chains so as to be free to withdraw laterally from the shaft.

A latch 29 locks the feeder blades against upward swinging movement while the blades are in the shaft. However, when an individual feeder blade reaches the lower part of the slot, the latch 29 is withdrawn against the action of the spring 30 by engagement of the ear 31 against a cam surface 32 which is stationarily located near the lower limit of travel of the feeder blades.

When the latch is withdrawn, and the chain continues to advance, the feeder blade swings about its pivot 28 against the action of the spring 33.

However, when the feeder blade has been completely withdrawn from the scrap, it is free to swing back into normal position under the action of the spring 33. At this time the latch 29 is also free from engagement with the cam 32, and is returned to its latching position by the spring 30, thus retaining the feeder blade against pivotal movement in that direction.

The feeder blade is prevented from moving in the opposite direction from the latch 29 by the pin 34 which engages the side of the chain.

My invention is by no means limited to the particular means of feeding and compressing the scrap illustrated in Figure 1. For the purpose of more clearly demonstrating this fact, I show in Figure 5 a variation in which charging is accomplished through an opening 35 and pressure is applied by a plunger 36 moving a piston 37 through the shaft and below the charging opening 35 to feed and compress the scrap.

It will be evident that the rate at which the scrap is fed and the continuous or intermittent character of the feeding will depend upon the speed of melting and the frequency of tapping of the furnace.

In operation scrap fed into the furnace near the top is engaged and forced downward by the feeder blades of Figure 1 or by the piston of Figure 5 until it comes within the preheating zone inside the preheating inductor 20.

The effect of the feeding means is twofold. Fresh scrap is forced down progressively to take the place of scrap which has been melted. The scrap in the preheating and melting zones is compressed, so that cabbaging will take place in the furnace itself. As the scrap becomes more highly heated in the preheating zone it will compress much more readily, so that the scrap will ordinarily be much denser in the preheating zone than above the preheating zone even though scrap at both places is subjected to the same pressure.

More important than this, however, the intimacy of contact between adjacent pieces of scrap and between parts of any individual piece of scrap is much increased by the compressing action, thus reducing the electrical resistance encountered by the secondary current and permitting the development of larger secondary currents to more advantageously inductively heat the scrap.

As permitted by the melting of the material in the melting zone, scrap from the preheating zone moves down under the feeding pressure to positions within the inductor sections 14 and 15.

In the melting zone the scrap is very highly heated, so that, if it be magnetic and not yet melted it will nevertheless normally be above decalescence. The desirability of using high frequency in the melting zone is therefore considerable. However, because of the high resistance of the charge in the preheating zone, high frequency there is also advantageous and would often be used.

High frequency is very beneficial not only because of the ease of power factor correction, but also because of the very rapid rate of change secured by high frequency, the consequent high power input throughout the charge and the improved flow of current across the gaps between adjoining pieces of the charge.

All of the magnetizable scrap loses its magnetism in the melting zone and the frequency used in the preheating zone can advantageously be lower than that desirable after it has lost its magnetism. For this reason the preheating coil may operate on lower frequency than the melting coils.

I prefer to construct the walls of the shaft and of the crucible from material which is not electrically conducting, so that inductive heating is confined to the scrap itself rather than distributed between the scrap and the walls of the furnace. Heating of the scrap by heat conducted from the walls of the furnace would be slow and inefficient, although to a certain extent it would be more advantageous than methods now used.

If the scrap were dense, the extent of penetration of the induced current would be very slight, but, because of the small total volume of metal, a considerable depth of penetration occurs, heating to great advantage.

Because of the great bulk of the scrap prior to melting, and the tremendous reduction in apparent volume after melting, it would hardly be convenient to supply all of the scrap for one furnace charge at one time, and therefore, I contemplate that scrap will be added at various stages of the melting operation as the depletion of scrap above the preheating zone warrants.

Whereas in the prior art it has been assumed that it was necessary to have an initial pool of molten metal into which the scrap is submerged, this is not necessary in scrap melting furnaces of the Northrup type. While the scrap could be fed into an initial pool, it is entirely practical to start with a furnace substantially free from molten metal and to continue operation until the molten metal reaches any desired approach to the full permissible capacity of the furnace.

In operation, feeding of turnings or other scrap to the shaft will be stopped when the molten metal in the furnace and the anticipated molten metal from the content of the shaft will fill the furnace crucible to the desired depth. All of the charge is then melted down for intermittent operation, after which the furnace is tapped. For continuous operation scrap is added at predetermined intervals and molten metal is tapped at other suitable intervals, all the while maintaining a full charge of scrap in the shaft.

The preheating coil about the lower part of the shaft above the crucible has the advantage of reducing the time of melting in the crucible. Since the preheating coil can, by regulating the power input and the character of the charge, be made to operate on magnetic material only, the inductance of this coil will be substantially constant and power factor correction for it will be relatively easy.

In the furnace pool, whether the charge be magnetic or not, there will be relatively little magnetic metal, and therefore the inductance of the coils surrounding the crucible will similarly be relatively constant and power factor correction will not be difficult.

Obviously, the diameter of the crucible and shaft can be made large enough to avoid induction of current beyond the center of the shaft. Aside from this, the size of the shaft will be determined largely by the type of scrap operated upon and the desirable conditions for compressing in the shaft.

While the above discussion is especially applicable to steel or iron turnings or similar scrap, for which the furnace is particularly suited, it will be evident that the invention is also applicable to nonmagnetic scrap.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention, what I claim as new and desire to secure by Letters Patent is:—

1. The method of melting scrap which consists in positively and progressively compressing the scrap and concurrently passing alternating current of high frequency about the scrap while under the positive pressure.

2. The method of melting uncabbaged scrap which consists in applying positive pressure to the scrap and inductively melting the compressed scrap in place.

3. The method of preheating scrap which consists in positively and progressively compressing the scrap to improve the intimacy of contact between parts of the scrap and concurrently inductively at high frequency heating the scrap at a zone of improved intimacy of contact.

4. The method of melting uncabbaged scrap in a shaft furnace which consists in positively feeding the scrap downward through the shaft to advance and compress it, inductively preheating the scrap at a zone of compression, further advancing the scrap and inductively melting the scrap, taking advantage of the improved intimacy of contact in the preheating and melting.

5. In a scrap melting furnace, a furnace body, positive means for applying pressure to the scrap in the body, an inductor coil surrounding the scrap at a zone of compression and a high frequency source of current for the coil.

6. In a scrap melting furnace, a furnace shaft, a surface adapted to move downwardly and compress the scrap in the shaft and an inductor coil surrounding the scrap in the shaft below the surface.

7. In a scrap melting furnace, a furnace shaft, a downwardly feeding conveyor in the shaft adapted to progress and compress the scrap and an inductor coil surrounding the scrap below the conveyor.

8. In a scrap melting furnace, a furnace shaft, a plurality of downwardly feeding conveyors at circumferentially spaced points about the shaft having blades extending into the shaft adapted to progress and compress the scrap and an inductor coil surrounding the scrap below the conveyors.

9. In a scrap melting shaft furnace, a furnace body, positive means for applying pressure to the scrap in the body shaft, an inductor coil surrounding the scrap at a zone of compression in the shaft to preheat it and means for melting the scrap after preheating.

10. In a scrap melting shaft furnace, a furnace shaft, a surface adapted to move downwardly and compress the scrap in the shaft, an inductor coil surrounding the scrap at a zone of compression to preheat it and means for melting the scrap after preheating.

11. In a scrap melting furnace, a furnace shaft, a downwardly feeding conveyor in the shaft adapted to progress and compress the scrap, an inductor coil surrounding the scrap below the conveyor to preheat it and means below the inductor coil for melting the scrap.

12. In a scrap melting shaft furnace, a furnace body, positive means for applying pressure to the scrap in the body, an inductor coil surrounding the scrap at a zone of compression in the shaft to preheat it and an inductor coil surrounding the scrap beyond the zone of preheating in the direction of scrap travel to melt the scrap.

13. In a scrap melting shaft furnace, a furnace shaft, a surface adapted to move downwardly and compress the scrap in the shaft, an inductor coil surrounding the scrap at a zone of compression in the shaft to preheat it and an inductor coil surrounding the shaft below the preheating zone to melt the scrap.

14. In a scrap melting furnace, a furnace shaft, a downwardly feeding conveyor in the shaft adapted to progress and compress the scrap, an inductor coil surrounding the scrap below the conveyor to preheat it and an inductor coil surrounding the shaft below the preheating zone to melt the scrap.

WILLIAM STEELL JACKSON.